Oct. 14, 1958  R. LEHDER  2,856,146
AUTOMOBILE CAMERA SUPPORT
Filed Sept. 10, 1954
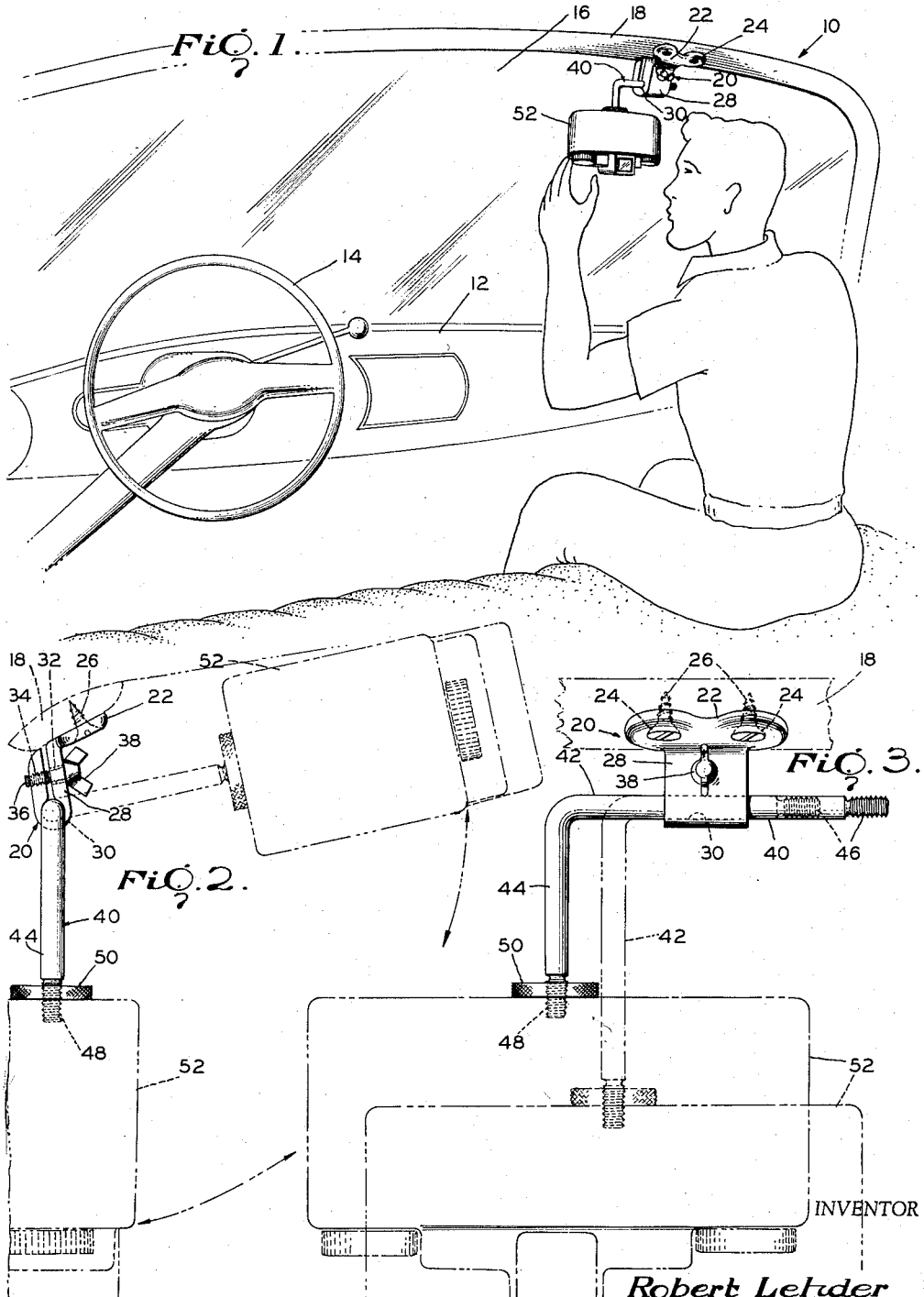
INVENTOR
Robert Lehder
BY
Gustave Miller,
ATTORNEY

United States Patent Office 2,856,146
Patented Oct. 14, 1958

2,856,146

AUTOMOBILE CAMERA SUPPORT

Robert Lehder, Stamford, Conn., assignor to
Gustave Miller, Washington, D. C.

Application September 10, 1954, Serial No. 455,226

1 Claim. (Cl. 248—291)

This invention relates to a camera support, and particularly relates to a camera support which is adapted to be used in a vehicle such as an automobile.

There have, heretofore, been various attempts to provide an adequate camera support means in an automobile to enable a person in the automobile to take a picture through the windshield. All these previous attempts, however, have been largely unsuccessful because the support was either not adequately adjustable or was adjustable through the use of ball and socket joints or the like. These ball and socket type of joints were too unstable to hold the camera firmly in its position of adjustment, especially when subjected to the vibrations of the car when in motion. Some of the prior devices also provided a support which was so arranged that it supported only the bottom part of the camera. This made the camera top heavy and extremely liable to tip over, especially when subjected to the vibrations of the car. Some of the prior devices also were so arranged that both the support and the camera projected across the windshield and tended to obstruct the view of either the driver or the passengers. This was especially true of the dashboard type of mountings.

Another disadvantage of this dashboard type of mounting was the fact that it was necessary to tilt the camera at a substantially large upward angle in order to avoid photographing the hood of the car. If the dashboard mounted support were vertically elongated so as to avoid photographing the hood, then the support would not only substantially block vision through the windshield but would also be excessively subject to vibrations.

It is one object of the present invention to avoid the above and other disadvantages of the prior devices by providing a suspension type of universal mounting which will neither block the rider's vision through the windshield of an automobile nor be excessively subject to vibrations.

Another object of the present invention is to provide a support means for a camera which is not only universally adjustable in its mounting but which can be adjustably positioned within its mounting to accommodate the camera to either short or tall persons.

Another object of the present invention is to provide a camera support for vehicles which is easy to operate and which consists of relatively few parts.

Other objects of the invention are to provide an improved camera support device, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawing in which:

Fig. 1 is a view showing a device embodying the present invention in use in an automobile.

Fig. 2 is an enlarged side elevational view of the device.

Fig. 3 is an enlarged front elevational view of the device.

Referring now in greater detail to the drawing wherein similar reference characters refer to similar parts, there is shown in Fig. 1 an automobile 10, provided with a dashboard 12, a steering gear assembly 14 and a windshield 16. Attached to the upper portion of the frame or molding 18 of the windshield is a bracket 20. This bracket 20 comprises a plate 22 provided with a pair of openings 24 through which are adapted to be inserted screws 26. The screws 26 are screwed into holes tapped into the frame 18, as indicated in the drawings, and serve to support the plate 22 on the upper portion of the frame.

Integral with the plate 22, and extending laterally therefrom, is a generally U-shaped collar 28 which is provided with an enlarged lateral groove 30 at the bend thereof. Extending through the center of each arm of the U-shaped collar 28 are openings as at 32 and 34. These openings are aligned with each other and are adapted to receive a screw 36 extending through one of them, as 32, and threaded into the other, 34. The screw 36 may be provided with a wing handle 38 for easier adjustment. The screw 36 with its wing handle 38 is provided for the purpose of drawing the two arms of the U-shaped collar 28 together to clampingly engage the stem 40 of a support member within the groove 30.

The stem 40 comprises an L-shaped bent rod which may be either tubular or solid and which comprises a long arm 42 and a short arm 44. Each of the arms 42 and 44 is provided with a reduced, screw-threaded end portions at 46 and 48. The screw-threaded ends 46 and 48 are adapted to be threadedly inserted, through a knurled lock nut 50, into an appropriate threaded opening in the camera 52.

When the collar 28 is loosened, the stem 40 is not only rotatable within the groove 30 but is also longitudinally movable therein. This means that the collar 28 can be unclamped, the stem 40 can be both rotatably and longitudinally adjusted, and then the collar can be clamped together to hold the stem in its adjusted position.

In Fig. 3, the dotted outlines show the alternate position of the stem in the collar wherein the short arm of the stem is mounted in the collar and the long arm is attached to the camera. This alternate arrangement provides an adjustment for shorter persons.

In operation, the support is mounted on the top portion of the windshield frame or possibly from the ceiling of the car and the camera is then attached to the support. A universal type view finder, not shown, is preferably connected to the camera. When in use, the support is swung to the operative position such as shown in Fig. 1. After use, it is swung upwardly, as viewed in Fig. 2, out of the way of the persons in the car and in a non-obstructive position relative to the persons in the car. It is to be noted that although the invention is illustrated in Fig. 1 as positioned adjacent the passenger's seat, it may equally be as well placed adjacent the driver's seat.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

In an automobile camera support, the combination of a bracket, including an apertured plate adapted to be secured to the upper frame molding of a windshield, a U-shaped collar having an enlarged lateral groove at the bend thereof extending laterally from and integral with said plate, the arms of said U-shaped collar having aligned centrally disposed apertures therethrough, one of which is threaded, a screw having a wing handle extending through said apertures, an L-shaped bent rod having a long leg and a short leg, either of said legs being selectively passed through said groove, said screw drawing said arms together clampingly to secure the selected leg of said L-shaped bent rod in said groove, a reduced threaded portion at the end of each of said legs, each threaded portion being adapted selectively to be threaded into a corresponding aperture in a camera, and a knurled lock nut engaging on the selected threaded portion.

References Cited in the file of this patent

UNITED STATES PATENTS

| Number | Name | Date |
|---|---|---|
| 1,391,915 | Starr | Sept. 27, 1921 |
| 1,408,900 | Miller et al. | Mar. 7, 1922 |
| 1,787,894 | Burke | Jan. 6, 1931 |
| 2,220,429 | Soderberg | Nov. 5, 1940 |
| 2,603,134 | Burman | July 15, 1952 |
| 2,619,312 | Tulchin | Nov. 25, 1952 |

FOREIGN PATENTS

| Number | Country | Date |
|---|---|---|
| 949,959 | France | Mar. 14, 1949 |
| 130,786 | Swedan | 1951 |
| 490,344 | Canada | Feb. 10, 1953 |